United States Patent
Tang et al.

(10) Patent No.: US 9,692,707 B2
(45) Date of Patent: Jun. 27, 2017

(54) VIRTUAL RESOURCE OBJECT COMPONENT

(75) Inventors: Changbin Tang, Shanghai (CN); Qin Zhu, Shanghai (CN)

(73) Assignee: Transoft (Shanghai), Inc., Shanghai (CN)

( * ) Notice: Subject to any disclaimer, the term of this patent is extended or adjusted under 35 U.S.C. 154(b) by 200 days.

(21) Appl. No.: 14/368,546

(22) PCT Filed: Sep. 7, 2012

(86) PCT No.: PCT/CN2012/081109
§ 371 (c)(1),
(2), (4) Date: Jun. 25, 2014

(87) PCT Pub. No.: WO2014/036717
PCT Pub. Date: Mar. 13, 2014

(65) Prior Publication Data
US 2014/0351443 A1    Nov. 27, 2014

(51) Int. Cl.
*H04L 12/911* (2013.01)
*H04L 12/931* (2013.01)
*G06F 9/455* (2006.01)
*G06F 9/50* (2006.01)

(52) U.S. Cl.
CPC .......... *H04L 47/70* (2013.01); *G06F 9/45533* (2013.01); *G06F 9/5077* (2013.01); *H04L 49/70* (2013.01); *G06F 9/45558* (2013.01)

(58) Field of Classification Search
CPC ............. G06F 9/45533; G06F 9/45558; G06F 9/5077; H04L 47/70; H04L 49/70
See application file for complete search history.

(56) References Cited

U.S. PATENT DOCUMENTS

| 8,135,603 | B1* | 3/2012 | Gordon | G06Q 10/0631 |
| | | | | 705/7.12 |
| 8,565,689 | B1* | 10/2013 | Rubin | G06F 11/00 |
| | | | | 370/232 |
| 8,898,507 | B1* | 11/2014 | Crable | G06F 11/1484 |
| | | | | 714/4.11 |
| 8,914,513 | B2* | 12/2014 | Dutta | G06F 9/06 |
| | | | | 709/224 |
| 9,118,687 | B2* | 8/2015 | Murphy | H04L 61/103 |
| 9,342,368 | B2* | 5/2016 | Sahu | G06F 8/61 |
| 2009/0037225 | A1* | 2/2009 | Burchianti, II | G06F 19/327 |
| | | | | 705/3 |
| 2009/0276771 | A1* | 11/2009 | Nickolov | G06F 9/4856 |
| | | | | 717/177 |
| 2011/0158088 | A1* | 6/2011 | Lofstrand | G06F 9/465 |
| | | | | 370/229 |
| 2013/0091502 | A1* | 4/2013 | Kang | G06F 9/45558 |
| | | | | 718/1 |

(Continued)

*Primary Examiner* — Uzma Alam
(74) *Attorney, Agent, or Firm* — Occhiuti & Rohlicek LLP

(57) ABSTRACT

The present invention discloses a Virtual Resource Object Component; it achieves the goal of mapping logical POD to physical POD. The technical solution is: the Virtual Resource Object Component abstractly represents the physical resources in a physical POD as virtual resources. An embodiment of the Virtual Resource Object Component is utilized in a service delivery platform which automatically organizes and connects the physical resources in the physical POD(s), and transforms them into virtual resources which will be delivered to a logical POD.

7 Claims, 9 Drawing Sheets

(56) References Cited

U.S. PATENT DOCUMENTS

2013/0166712 A1* 6/2013 Chandramouli ........ G06F 9/505
    709/223
2013/0297800 A1* 11/2013 Considine ............. G06F 9/5088
    709/226
2014/0052825 A1* 2/2014 Luecke ................. H04L 67/327
    709/219

* cited by examiner

VIRTUAL RESOURCE OBJECT COMPONENT

CROSS REFERENCE TO RELATED APPLICATION

This application is the national phase under 35 USC 371 of international application no. PCT/CN2012/081109, filed Sep. 7, 2012. The contents of the aforementioned application is incorporated herein in its entirety.

FIELD OF THE INVENTION

The disclosed invention relates to computer virtualization technology and delivery and deployment of physical resource and virtual resource in an enterprise data center. More specifically, the present invention relates to a novel implementation model called Virtual Resource Object Component, and the technology of utilizing this component to map physical POD (Point of Delivery) to logical POD (Point of Delivery). Among the mapping process, the main focus of the present invention is how to abstractly represent the physical resources in a physical POD as virtual resources. Based on the description of Virtual Resource Object Component, the implementation environment of the present invention—a service delivery platform—can automatically organize and connect the physical resources in a physical POD, and transform them into virtual resources which can be delivered to a logical POD, therefore realize the fast delivery and fast deployment of the network, compute, storage, and service resources in an enterprise data center.

BACKGROUND

The concept of POD (Point of Delivery) was first proposed by Cisco. It represents a type of fast-deployable, fast-deliverable construction module. It is also a duplicable design pattern, which can maximize modularization, scalability, and manageability of a data center. A POD allows a service provider to gradually increase the network, compute, storage, and service resources; and provides all of these infrastructure modules to meet the needs of the service provision. The difference between a POD and other design patterns is that it is a deployable module—this module provides "services", and all the resources within it share the same fault domain. In another word, if a failure occurs in a POD, only those projects operating within the POD will be affected, and the projects in adjacent PODs will not. The most important part is the virtual applications in the same POD can migrate freely; there is no so-called routing obstacle.

For different users, the POD designs might be different. For example, Cisco VMDC2.0 architecture specifies two POD designs: compact and large. Essentially, the difference between two POD designs mainly lies in capacity rather than in capability. At implementation level, the composition of a POD depends on the vender. Most venders consider POD as consisted of an Integrated Compute Stack. It provides a set of pre-integrated network, compute, and storage devices. As a single solution, it is easy to purchase and manage, and able to help save capital expenditures (CAPEX) and operational expenditures (OPEX). For example, Cisco provides two POD examples: Vblock and FlexPod. The main difference between the two lies in the choice of storage in the solution. In a Vblock, storage is provided by EMC; and in a FlexPod, storage is provided by NetApp. Despite the differences, the concepts remain the same; it provides an Integrated Compute Stack that combines network, compute, and storage resources; and enables progressive scaling with predictable performance, capacity, and facilities impact.

Conventional virtual resource scheduling technologies are disclosed by the following patents.

(1) Patent CN101938416A "A Cloud Computing Resource Scheduling Method Based on Dynamic Reconfiguration of Virtual Resources". According to the cloud application loading information collected by cloud application monitors, it makes dynamic decisions based on the loading capacity of the virtual resources that support cloud applications and the current loads of cloud applications, and dynamically reconfigures virtual resources for cloud applications based on the result of the decisions.

(2) Patent CN102170474A "A Dynamic Scheduling Method and System for Virtual Resources in Cloud Computing Networks". By live migration of virtual resources, it achieves dynamic scheduling, dynamic load balancing, and efficient use of virtual resources in the cloud through load balancing.

The virtual resources in above two patents only refer to virtual machines, and physical resources refer to the CPU, memory, and storage (disk) associated with the virtual machines. Although these two patents both involve virtual resource scheduling, virtual resources here only refer to computing resources, other than storage and network resources.

(3) Patent CN102291445A "A Cloud Computing Management System Based on Virtualized Resources". By using Browser/Server architecture and virtual machine technology, it allows users to rent virtual machine on-demand through self-service at any time any place. Through customized virtual machine configuration, the system enables users to utilize the resources more effectively.

The underlying virtual resource layer mentioned in the patent includes virtual resource pool, virtual machine management (VM Manager) module, virtual machine server (VM Server) module and virtual machine storage (VM Storage) module. This patent involves compute resource and storage resource virtualization, but not network resource virtualization.

(4) Patent US20080082983A1 "Method and System for Provisioning of Resources". It involves a method of autonomous provisioning of resources of a computer system. The tasks includes monitoring performance-critical workload of the computer system; detecting workload suffering based on comparison of the performance-critical workload and defined values of performance-critical workload goals; determining types of missing resources; determining additional resources available for activation; activating the additional resources, and generating a notification of the activation for being sent to a system provider for automated billing of the added capacity.

This patent mentions "(Optional) virtualized hardware platform", which refers to virtual machines only (see FIG. 1 in Patent US20080082983A1). Since virtualized hardware platform is "optional", in another word, the system is able to work properly without use of virtual machines; and the virtualization technology is not a critical part of the autonomous resource provisioning method. Obviously this is quite different from the situation (in the present invention) where regards virtualization technology as the key technology of mapping physical POD to logical POD.

(5) CN102292698A and US20100198972A1 actually are the Chinese version and the US version of the same patent: "Methods and Systems for Automated Management of Virtual Resources in a Cloud Computing Environment". The applicant of these two patents is Citrix System Inc., and the contents of the patents are almost identical, which involve a system for automated management of virtual resources in a cloud computing environment including a host computing device communication component and a storage system communication component. The storage system communication component identifies a storage system in a storage area network and directs the automated provisioning of a virtual storage resource on the identified storage system.

Virtual resources mentioned in this patent refer to virtual storage resources in a cloud computing environment, and do not include compute resources and network resources. It is quite different from the situation (in the present invention) where compute resources, storage resources, and network resources are orchestrated as a whole.

SUMMARY

The objective of the present invention is to remedy above problems. By providing a Virtual Resource Object Component, it achieves the goal of mapping logical POD to physical POD.

The technical solution of the present invention is: the present invention discloses a Virtual Resource Object Component, which abstractly represents the physical resources in a physical POD as virtual resources. An embodiment of the Virtual Resource Object Component is utilized in a service delivery platform which automatically organizes and connects the physical resources in the physical POD(s), and transforms them into virtual resources which will be delivered to a logical POD.

According to the embodiment of the Virtual Resource Object Component of the present invention, the Virtual Resource Object Component includes independent physical storage POD and independent server POD. The server POD includes multiple network nodes; each network node represents a physical server, and includes multiple virtual machine instances; each virtual machine instance represents a virtual server, and includes multiple virtual ports composed of virtual storage ports, virtual management ports and virtual service ports; each virtual port connects to a corresponding virtual switch; each network node also includes multiple virtual switches; a virtual switch connects to physical Ethernet NIC (Network Interface Card), iSCSI HBA (Host Bus Adapter) or FC (Fibre Channel) HBA, wherein (1) NICs connect to a physical switch network outside the network node via LAG (Link Aggregation Group), and then connect further to a FC switch for NAS (Network Attached Storage), DFS (Distributed File System) and software simulated iSCSI, (2) iSCSI HBAs connect directly to a storage pool, and (3) FC HBAs or FCoE (Fibre Channel over Ethernet) HBAs connect to optical switches; an optical switch connects to the storage pool via multiple channels. The physical switch connects to an ASwG (Application Switch Group); the ASwG can divide VLANs (Virtual Local Area Network); a load balancer receives external requests and achieves Elastic IP Addresses; an external request will be assigned to a VLAN by the load balancer based on the real-time workload information.

According to the embodiment of the Virtual Resource Object Component of the present invention, a logical POD is a combination of logical compute, network, and storage resources required by a user's business project; a logical POD is specified by user, wherein the resources have the characteristics of sharing time and space.

According to the embodiment of the Virtual Resource Object Component of the present invention, a physical POD is the physical unit of resource provisioning, which is consists of the device sets defined and divided in the data center; a physical POD works independently from other devices (outside the POD), and becomes the basic unit of resource provisioning.

According to the embodiment of the Virtual Resource Object Component of the present invention, the server POD provides at least the first physical-service interface for its service consumer, and enables the application user of the POD to consume the resources within the POD.

According to the embodiment of the Virtual Resource Object Component of the present invention, the server POD provides at least the second physical-service interface for its service provider, enables the service provider of the POD to realize predefined POD specifications on his/her own will, and consumes the resources naturally bound on each device.

According to the embodiment of the Virtual Resource Object Component of the present invention, the server POD includes a physical management interface, and enables the system operator to manage the server POD according to the ITU-T TMN standard, wherein the system operator only provides the divisions of physical PODs for the application delivery, but not management which is achieved via a separate path; management is usually divided by user domain, department domain, or geographic region. Therefore the PODs are application-service facing and the domains are management facing.

According to the embodiment of the Virtual Resource Object Component of the present invention, the physical service interfaces (including the first physical service interface, the second physical service interface) and the physical management interface are deployed on different networks; the different networks include separated IP address hierarchies and different broadcast segments.

According to the embodiment of the Virtual Resource Object Component of the present invention, the server POD supports multi-tenant applications and achieves separation between different service provisions.

According to the embodiment of the Virtual Resource Object Component of the present invention, the service delivery platform includes three levels of scheduling units, wherein:

Project Delivery Scheduling Unit, includes the Requirement Design Service of computing, storage, and network resources, System Resource Analysis Service, Virtual Resource Subscription and Deployment Service. The deployment is a process of binding logical resources to virtual resources in a logical POD; the logical resources are bound to the virtual resources in a form of one-to-one matching. It is the first-time binding in the whole automated subscription-delivery process of the logical POD.

Virtual Resource Scheduling Unit includes the virtual resource allocation, configuration, and provisioning services. The process of binding virtual resources to physical resources is undertaken by the Resource Engine. It is the second-time binding in the whole automated subscription-delivery process of the logical POD. The Resource Engine provides various virtual resource capabilities by aggregation of different virtual resources, and preserves the states of each virtual resource status models, thereby carries out the resource bindings between virtual resources and physical resources;

Physical Resource Scheduling Unit includes different agents residing in physical resources to receive instruction of resource configuration from the Resource Engine. The Physical Resource Scheduling Unit achieves resource multiplexing, resource space sharing. The resource status information is sent back to the Resource Engine through the agents.

According to the embodiment of the Virtual Resource Object Component of the present invention, the Resource Engine carries out the resource bindings between virtual resources and physical resources in the automated subscription-delivery process of the logical POD, and provides various virtual resource capabilities for upper level by aggregation of different virtual resources; a physical POD includes compute, network and storage resources, in which individual agents carry out specific deployment operations, and send the status information of specific resource back to the Resource Engine via the ICM (infrastructure communication manager); the PODs and the Resource Engine comply a client/server architecture; the Resource Engine includes a vFSM (virtual finite state machine) executor, deployment rule base, various of virtual resource status and resource engine capabilities; the resource engine leverages vFSM to manage virtual resources, and calculates the capabilities of various resources in the service delivery process; vFSM is a finite state machine defined in the virtual environment; according to the rule base of deployment and the status of various virtual resources, vFSM is executed to resolve the resource competition problem among multiple logical resources in a logical POD; the status of various virtual resources includes instance status, network status, storage status, and cache status of the virtual resources; the capabilities of the Resource Engine achieves the various functions of capability management; the reference model is not only used to preserve the resource information of the physical resources (including network, storage and compute resources) in a physical POD, but also to store all virtual resource information described by virtual resource data model, and the backup rules of the deployment rule base.

Compared to the prior art, the present invention has the following advantages: the Virtual Resource Object Component of the present invention can map logical PODs to physical PODs. In the conventional technology, since the underlying physical resources are not virtualized, a logical POD can only be delivered by the physical resources of physical PODs. In contrast, when physical resources are virtualized, the virtual resources supported by the physical resources of a physical POD can be represented by the abstract models. Thus, a Logical POD can be delivered by the virtual resources and part of the physical resources of the physical POD.

The difference between the present invention and the prior art is mainly laid in the following three aspects:

1) The present invention not only involves server (compute resource) virtualization, but also concerns with storage and network resource virtualization.

2) The present invention no longer manages resources by using a single physical or virtual resource as unit, but rather orchestrates the compute, storage, and network resources as a whole by using POD as unit.

3) The problem needs to be solved by the present invention is laid in the method and process of how to map logical PODs to physical PODs.

DETAILED DESCRIPTION

Figure 1:
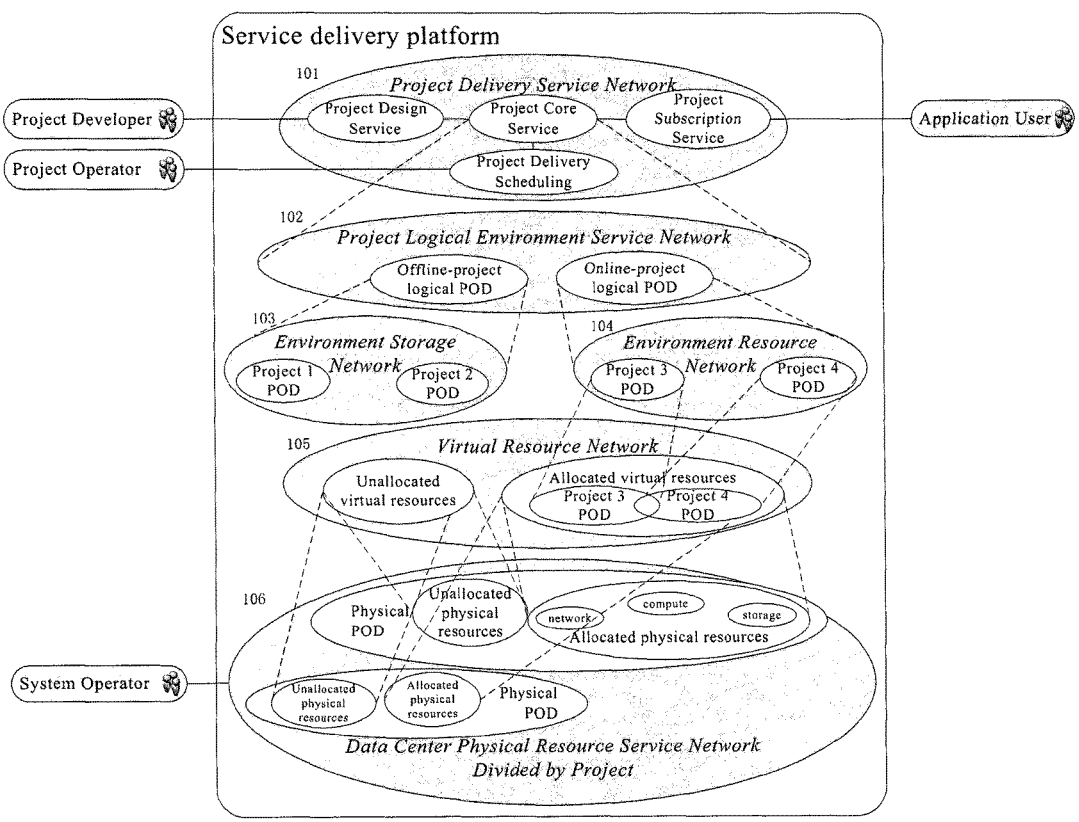
FIG. 1 is the conceptual diagram of the delivery process realized by the service delivery platform of the present invention.

The present invention and its embodiment will be described in following sections with illustrations.

Before describing the present invention with illustrations, we shall introduce the basic knowledge of the embodiment of the present invention.

The ultimate goal of the present invention is to improve resource utilization efficiency and achieve the dynamic scheduling of small-scale POD resources. In the present invention, a POD can be classified as a logical one or a physical one. The so-called logical POD is a combination of logical compute, network, and storage resources required by a user's business project. A logical POD is specified by user, wherein the resources have the characteristics of sharing time and space. A physical POD is consists of the device sets defined and divided in a data center. It is the physical unit of resource provisioning; the physical unit works independently from other devices, and becomes the basic unit of resource provisioning. In another word, the basic unit of resource provisioning is not a physical server, a virtual server or a virtual switch, but a (meaningful) set of them. The POD concept described by Cisco is equivalent to the "physical POD" introduced here. By Cisco's definition, a POD may include multiple Network Containers; a Networks Container can include multiple Zones. Distinguishing between logical POD and physical POD, in particular, representing the virtual resources supported by the physical resources of a physical POD as an abstract model, and the method of delivering each virtual resource to a logical POD according to the abstract model, reflects the originality of the present invention.

The purpose of using PODs:

(1) pre-defining the logical unit, for example: a logical POD;

(2) using POD as a unit, which can simplify the capacity estimation process;

(3) the modular design will be easier for adopting new technologies;

(4) leveraging fault isolation, i.e. a fault only affects the projects within the same POD;

(5) the modularity and scalability of PODs make the operations more consistent and efficient, and easier to manage.

About logical POD, it's worth noting:

(1) A logical POD often contains multiple servers. These servers are "virtual servers", which are the abstract representation of the servers, i.e., a type of virtual resources; in this context, the virtual servers can over-subscribe physical servers through sharing space or time. The term "server virtualization" refers to a single physical server support to run multiple VMs (Virtual Machines) to realize the function of sharing space or time. In this context, VM is concrete (software) rather than logical. On a host server, each VM may have a different hardware specification. Physical servers are neither visible to the provisioning instances of a logical POD, nor to the application users (2) Besides the hardware specifications of a virtual server can be provisioned on-demand, the operating system of the virtual server can also be provisioned on-demand on each virtual server.

(3) Besides the operating system of a virtual server can be provisioned on-demand, application server (software) can also be provisioned on-demand on each over-subscribed operating system.

The present invention focuses on (1). The relationship between logical and physical resources can be summarized as following: from a business project to a logical POD is a one-to-one mapping process; from logical PODs to physical PODs is a multiple-to-multiple mapping process. By subscribing the logical resources in a logical POD, a project developer thus in further subscribes distributed physical resources of the physical PODs. The physical resources of a physical POD are delivered to the logical POD in the form of virtual resources; these virtual resources will be bound to the logic resources in the logical POD in the form of one-to-one mapping.

The embodiment of the present invention is a service delivery platform. The platform has four types of users: Project Developer, Project Operator, Application User, and System Operator.

Please see FIG. 1, which is the embodiment of the present invention: a service delivery platform, i.e. an automation system of supporting subscription-delivery process of logical PODs. The service delivery platform includes: Project Delivery Service Network 101, Project Logical Environment Service Network 102, Project Logical Environment Storage Network 103, Project Logical Environment Resource Network 104, Virtual Resource Network 105, and Data Center Physical Resource Service Network Divided by Project 106.

Project Delivery Service Network 101 includes: Project Core Service, Project Design Service, Project Delivery Scheduling, and Project Subscription Service;

In Project Logical Environment Service Network 102, the project delivery and scheduling function supports automatic or manual "offline-online" environment switching, and supports the POD scheduling of multiple projects. Project Logical Environment Service Network 102 includes multiple logical PODs of offline-projects and online-projects;

Project Logical Environment Storage Network 103: includes multiple PODs of offline-project instances;

Project Logical Environment Resource Network 104 includes multiple PODs of online-project instances; for example: project 3 and project 4 in FIG. 1 are in "online" status, i.e. making dedicated-resource deliveries for the subscriptions.

In Virtual Resource Network 105, virtual resources aggregate physical resources of different configurations from different locations, to achieve resource consolidation regardless of types and deployments of the physical resources. Including unallocated and allocated virtual resources, Virtual Resource Network provides support (functions) of exclusive holding or sharing virtual resources.

Data Center Physical Resource Service Network Divided by Project 106 includes multiple physical PODs. The Data Center Physical Resource Service Network Divided by Project 106 supports subscription-delivery of PODs, and supports sharing physical resources by space or by time, including unallocated and allocated physical resources, for example: network, storage, compute resources. Besides various physical resources in a physical data center, the System Operator is also responsible for defining the boundary of a physical POD.

The service delivery platform includes three levels of scheduling:

(1) Project Delivery Scheduling, includes the Requirement Design Service of computing, storage, and network resources, System Resource Analysis Service, Virtual Resource Subscription and Deployment Service. The Deployment Component 201 is closely related to the present invention. The deployment is a process of binding logical resources to virtual resources in a logical POD; the logical resources are bound to the virtual resources in a form of one-to-one matching. It is the first-time binding in the whole automated subscription-delivery process of the logical POD.

(2) Virtual Resource Scheduling includes the virtual resource allocation, configuration, and provisioning services. Please see FIG. 2. The Resource Engine 204 is closely related to the present invention. The process of binding virtual resources to physical resources is undertaken by the Resource Engine 204. It is the second-time binding in the whole automated subscription-delivery process of a logical POD. The Resource Engine 204 provides various virtual resource capabilities by aggregation of different virtual resources. The Resource Engine 204 also preserves the states of each virtual resource status models, thereby carries out the resource bindings between virtual resources and physical resources;

(3) Physical Resource Scheduling includes Agent 206, 207, and 208 residing in physical resources to accept instruction of resource configuration from Resource Engine 204. The Physical Resource Scheduling achieves resource multiplexing, resource space sharing. The resource status information is sent back to Resource Engine 204 through the Agent 206, 207, and 208.

Figure 2:
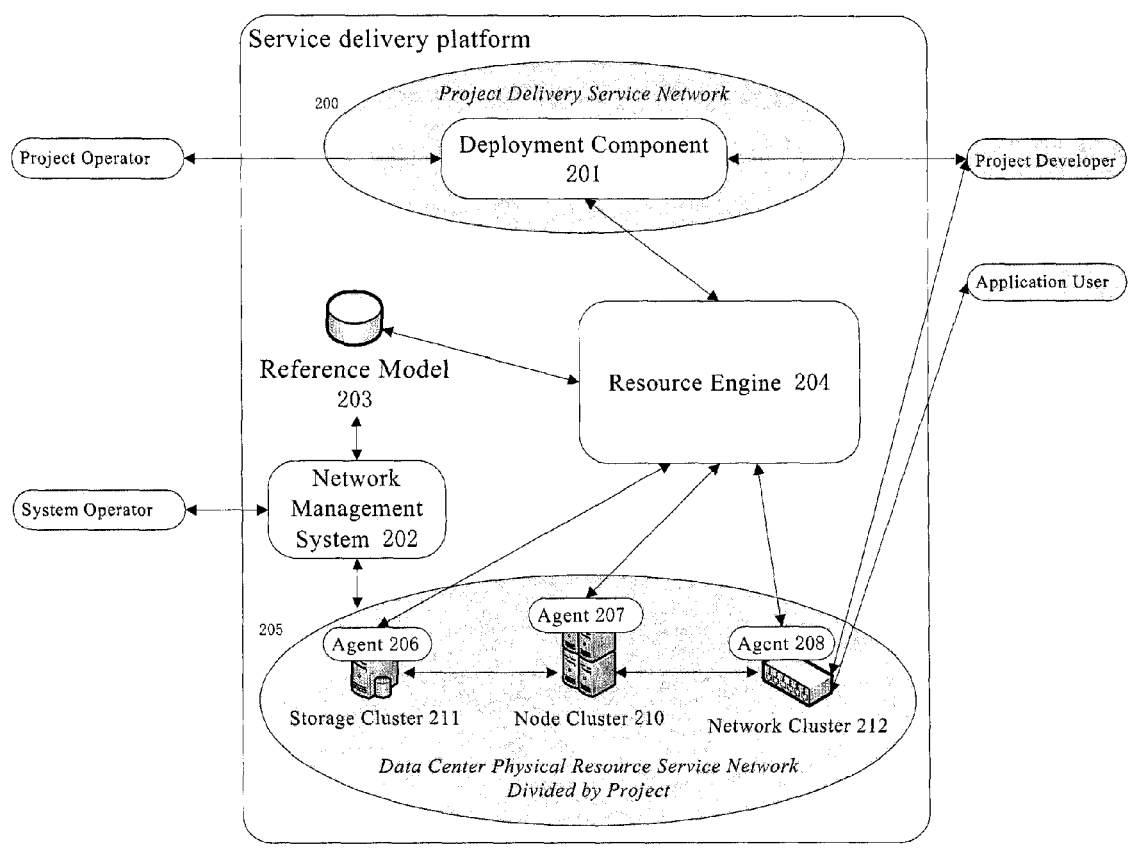
FIG. 2 is the structure diagram of the service delivery platform of the present invention.

Please see FIG. 2, the Resource Engine 204 uses the physical resource information provided by Network Management System 202 (NMS) to track the physical resources to get the latest states of the resources and map physical resources to virtual resources. Generally, most of the commercial network management systems for managing physical resources can provide information about state and performance, and have the functions of searching and finding physical resources, so the details are beyond the scope of the present invention and need not be given here.

Figure 3:
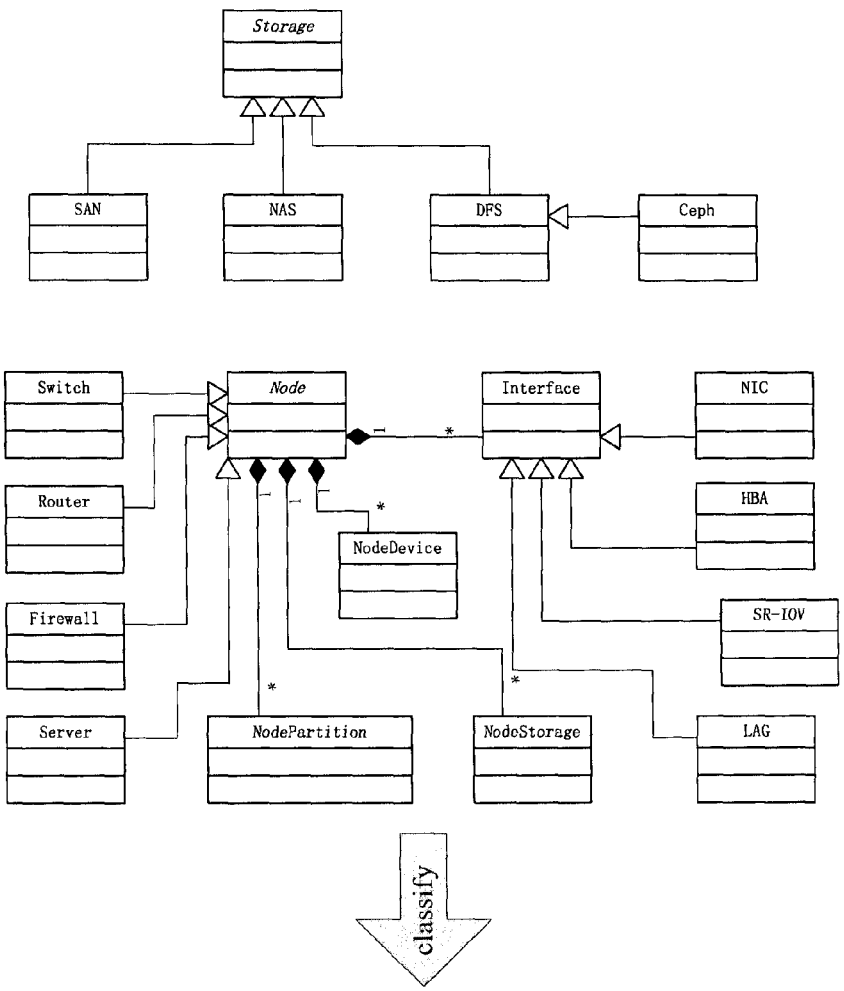
FIG. 3 is the classification diagram of the physical resources provided by the Network Management System.
Figure 3:
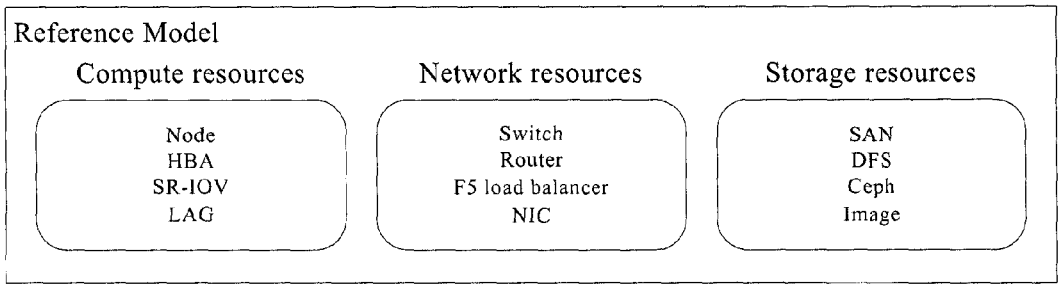

Please see the upper half of FIG. 3, which is an UML class diagram of the physical resource modules provided by a network management system. The figure includes two abstract classes: Storage and Node. Furthermore, class Storage includes three sub-classes: Storage Area Network (SAN), Network Attached Storage (NAS) and Distributed File System (DFS). Ceph is a type of DFS. Class Node includes four sub-classes: Switch, Router, Firewall and Server. Actually more sub-classes of Class Node exist in the real world, which are omitted in FIG. 3.

Please see the upper half of FIG. 3. Class Node has a composition relationship with four related classes: Interface, NodeDevice, NodeStorage, and NodePartition. Among them, Class Interface includes four sub-classes: NIC (network interface card), HBA (host bus adapter), SR-IOV (single root I/O virtualization), and LAG (link aggregation group). Actually more sub-classes of Class Interface exist in the real world, which are omitted in FIG. 3

Please see the lower half of FIG. 3. The service delivery platform of the present invention identifies each sub-class of above Node class and classifies them into network resources or compute resources, and adds some specific (in contrast to general Network Management Systems) classes of the delivery platform of the present invention such as F5 Load Balancer, Image etc. Thus, the physical resources include three types of resources: network, storage, and compute. Among them, the compute resources include: node (i.e. various physical servers), HBA, SR-IOV, and LAG etc. The network resources include: switch, router, F5 load balancer, and NIC. The storage resources include: SAN, NAS, DFS, Ceph, and image, etc. The information of above three-type physical resources is stored in the Reference Model 203. Please see FIG. 2.

Physical resources can be divided into multiple physical PODs or a single physical POD. Each physical POD can have multiple clusters (for example: Node Cluster 210, Storage Cluster 211, and Network Cluster 212). The number of logical PODs can also be multiple due to different users may have different designs. In the simple case of delivering a single physical POD to a single logical POD, binding the physical resources of the physical POD to the logical resources subscribed by the logical POD is not necessary a one-to-one mapping process (in contrast, binding the virtual resources of a physical POD to the logical resources of a logical POD is a one-to-one mapping process), since virtual resources can over-subscribe physical resources by sharing space or time.

The novelty and creativity of the present invention lies in how to abstractly represent the physical resources of a physical POD as virtual resources. The main focus of the present invention is an implementation model, called Virtual Resource Object Component. Please see FIG. 4. According to this model, the physical resources in a physical POD can be organized and connected together. With proper organization and meticulous creation, they are transformed into virtual resources which can be delivered to a logical POD.

Figure 4:
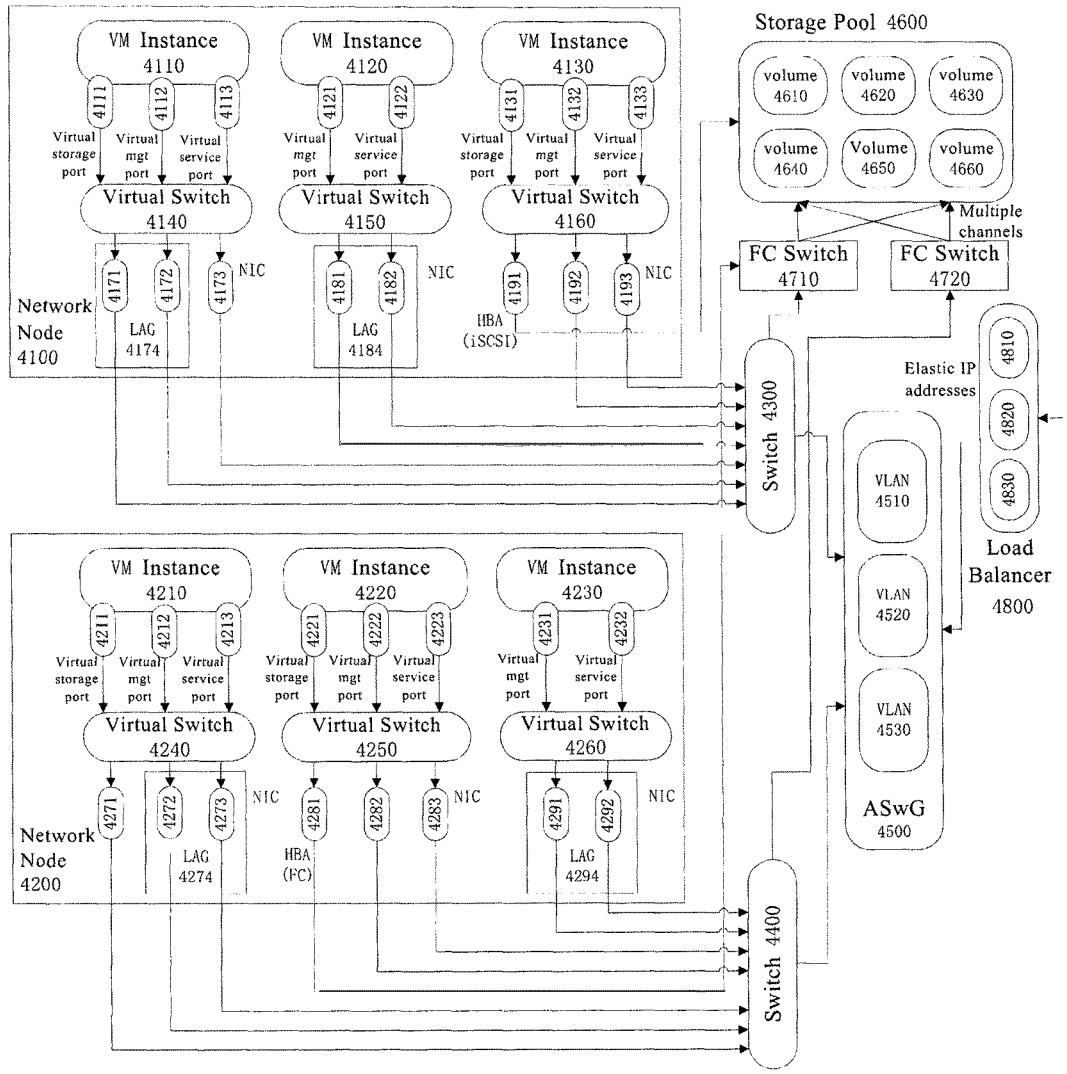
FIG. 4 shows the Virtual Resource Object Component of a physical POD.

Please see FIG. 4. This is a Virtual Resource Object Component of a physical POD (wherein Storage Pool 4600 is an abstract module which can be considered as an independent "physical storage POD", and the rest can be considered as a "server POD"). FIG. 4 Virtual Resource Object Component has two network nodes: Network Node 4100 and Network Node 4200; each network node represents a physical server; a single network node can be duplicated and the Virtual Resource Object Component can be linearly expended. Network Node 4100 has three VM instances: VM Instance 4110, VM Instance 4120, and VM Instance 4130; each VM instance represents a virtual server; a single VM instance can be duplicated and the network node can be linearly expended. VM Instance 4110 has three virtual ports: Port 4111, Port 4112 and Port 4113; Port 4111 is virtual storage port, Port 4112 is virtual management port, Port 4113 is virtual service port (the configurations can be adjusted according to actual needs); a single port can be duplicated and the VM instance can be linearly expended. The three virtual ports: Port 4111, Port 4112 and Port 4113 are connected to the same Virtual Switch 4140.

Please see FIG. 4. Network Node 4100 has three virtual switches: Virtual Switch 4140, Virtual Switch 4150 and Virtual Switch 4160; a single virtual switch can be duplicated and the network node can be linearly expended (but the number of virtual switches is limited by the number of physical NICs). Virtual Switch 4140 connects to NIC 4171, NIC 4172, and NIC 4173. NIC 4171 and NIC 4172 connect to Switch 4300 via LAG 4174. Virtual switch 4150 connects to NIC 4181 and NIC 4182, both of which connect to Switch 4300 via LAG 4184. Virtual Switch 4160 connects iSCSI HBA 4191, NIC 4192, and NIC 4193. Among them, iSCSI HBA 4191 directly connects to Storage Pool 4600.

Please see FIG. 4. Except iSCSI HBA 4191 directly connects to Storage Pool 4600, the other seven NICs of Network Node 4100's: NIC 4171, NIC 4172, NIC 4173, NIC 4181, NIC 4182, NIC 4192, and NIC 4193 all connect to Physical Switch 4300; except FC HBA 4281 directly connects to FC Switch 4710, the other seven NICs of Network Node 4200's: NIC 4171, NIC 4172, NIC 4173, NIC 4182, NIC 4183, NIC 4191, and NIC 4192 all connect to Physical Switch 4400. Either Switch 4300 or Switch 4400 can connect to FC Switch 4710 or FC Switch 4720; FC Switch 4710 and FC Switch 4720 connect to Storage Pool 4600 through multiple channels. Notably, iSCSI HBA directly connects to the storage pool; FC HBA or FcoE (Fibre Channel over Ethernet) connects to the FC switches, and they are used for SAN (storage area network); NICs connect to the switches, and they are used for NAS (network-attached storage), Ceph, or software simulated iSCSI.

Please see FIG. 4. Switch 4300 and Switch 4400 connect to ASwG 4500 (Application Switch Group). ASwG 4500 can divide VLAN s, for example: VLAN 4510, VLAN 4520 and VLAN 4530; the number of VLAN can be linearly expanded. Load Balancer 4800 receives external requests and achieves Elastic IP Addresses; an external request will be assigned by Load Balancer 4800 to a VLAN to handle based on the real-time workload information.

Please see FIG. 4. Because Storage Pool 4600 has been virtualized and becomes an abstract concept, we need to specify the "physical storage PODs", including FC SAN POD, IP SAN POD, and NAS POD, which are distinguished from the server POD. From the viewpoint of network topology, all physical storage PODs are separated. There is non-overlapping among them. One criteria of dividing a set of PODs is they are independent and mutually exclusive; but for storage devices (e.g. SAN), they are usually shared resources; therefore Storage Pool 4600 has its own characteristics. The only reason for defining physical storage PODs is that they will be subscribed by multiple server PODs (from the viewpoint of a single POD, it is a centralized share mode at the POD level).

Please see FIG. 4. Storage PODs must work with other server PODs through the communication channels between these PODs—currently the channels can be backbone network and SAN FC switches. When a Project Developer specifies the service requirement with a logical POD, it may include storage capabilities as well (which is quite common). When the requirement has been passed down to the physical POD layer, by using the communication channels between the PODs, the mapped (target) physical POD will subscribe a partition of shared storage POD to meet the requirement. As for the partition rules applying (e.g. using entire SAN equipment, or LUN, or volume as the unit), it is depended on the System Operator. For example, in FIG. 4, Storage Pool 4600 uses volume as the unit. The default rules are LUN partition provides the tenant-level isolation and volume partition provides the separation between the tenant's projects.

Figure 5:
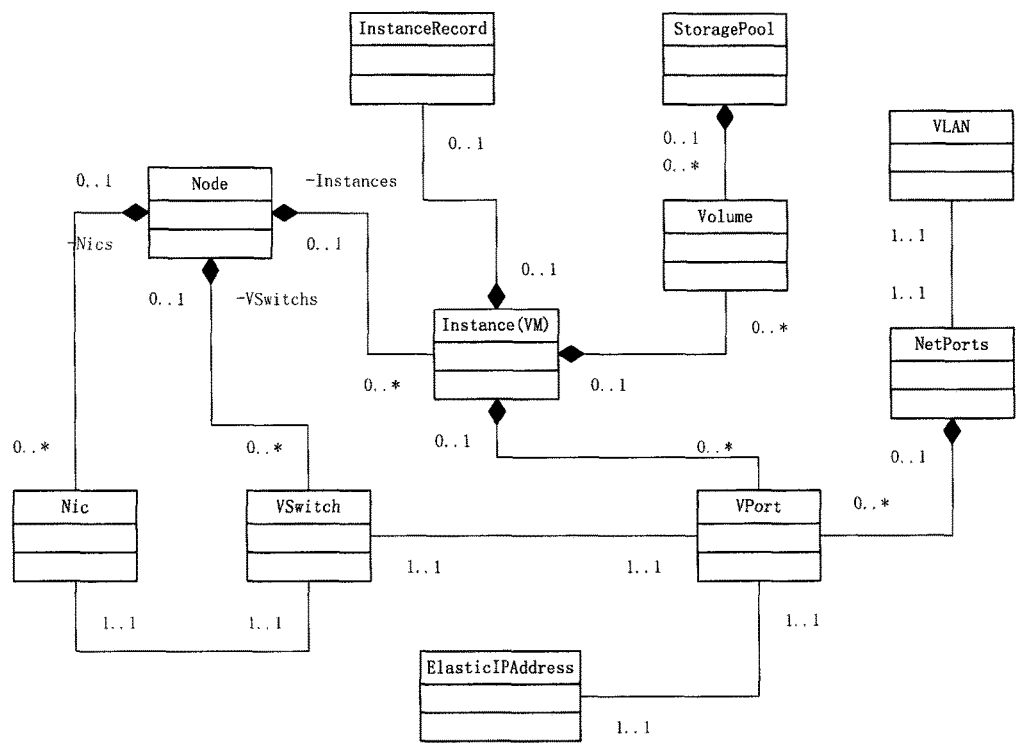
FIG. 5 shows the virtual resource data model.

Please see FIG. 5. Virtual Resource Data Model includes 11 classes: Node, Instance (VM), VPort (virtual port), VSwitch (virtual switche), NIC, NetPort (network port), VLAN (virtual network), ElasticIPAddress, Volume, StoragePool, and InstanceRecord. Each class in the Virtual Resource Data Model (the variables of the classes are omitted in FIG. 5) represents the physical and virtual resources of Virtual Resource Object Component in FIG. 4, and reflects the dependent relationship among several physical and virtual resources. Node has a composition relationship with multiple Instances (VM), multiple VSwitches, and multiple NICs. Vswitch has one-to-one association relationship with Nic. Instance (VM) has a composition relationship with multiple VPorts, multiple Volumes, and multiple InstanceRecords. Vport has one-to-one association relationship with Vswitch. StoragePool has a composition relationship with multiple Volumes. NetPort has a composition relationship with multiple VPort. VLAN has one-to-one association relationship with NetPort. ElasticIPAddress has one-to-one association relationship with Vport. All the virtual resource information described by Virtual Resource Data Model is stored in Reference Model 203. Please see FIG. 2.

Figure 6:
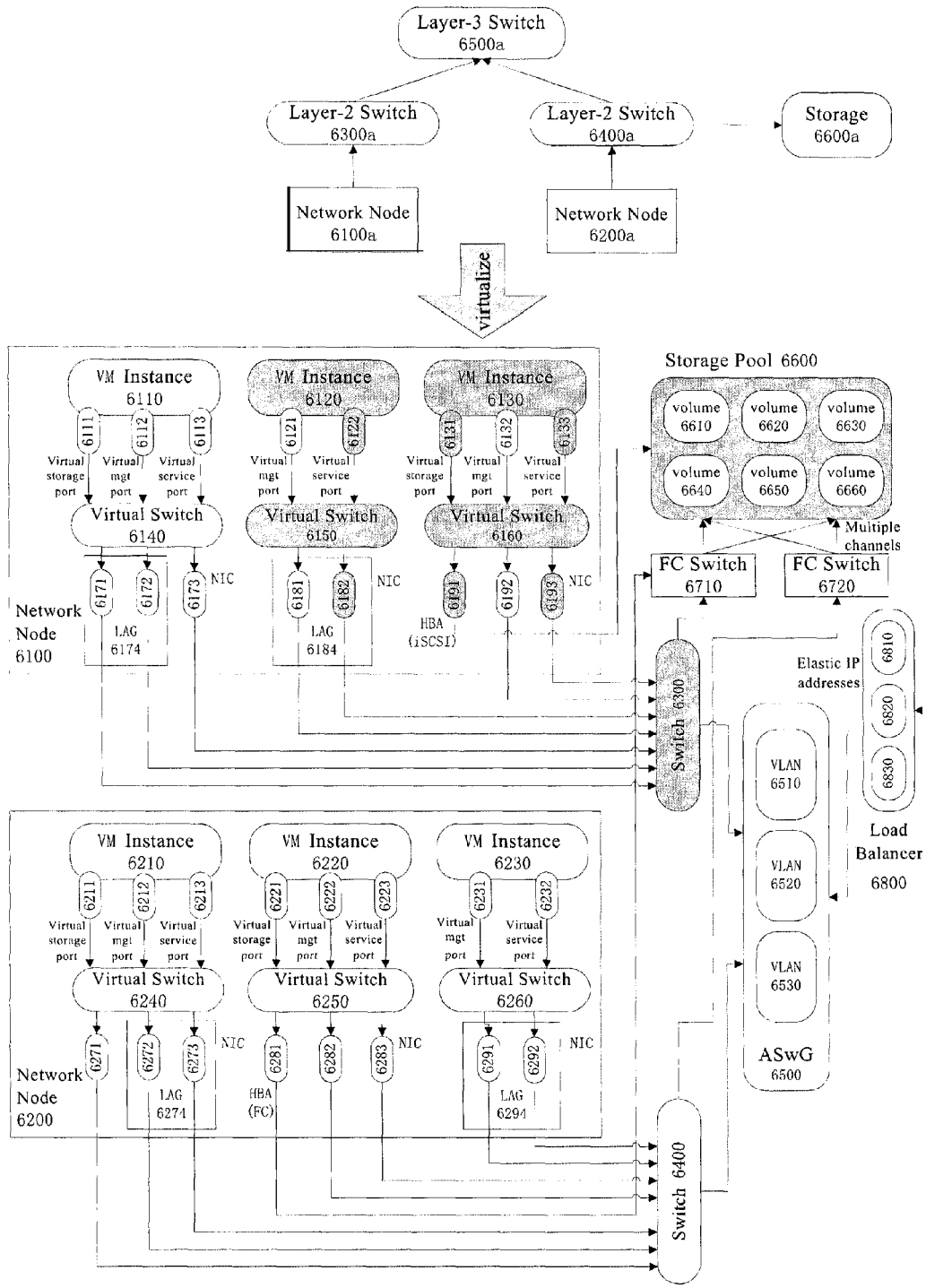
FIG. 6 shows an embodiment of mapping a logical POD to physical POD.

Please see FIG. 6, an embodiment of mapping logical POD to physical POD (FIG. 6 includes a "server POD" and a "physical storage POD"; the mapping process described below mainly focus on the "server POD"). The upper half of FIG. 6 is the topology of a logical POD planned/designed by a Project Designer/Project Developer. It includes: Network Node 6100a, Network Node 6200a, layer-2 Switch 6300a, layer-2 Switch 6400a and layer-3 Switch 6500a; Network Node 6200a can access Storage 6600a via Switch 6400a. In the case that physical resources are not virtualized, the logical POD can only be delivered by the physical resources of the physical POD. They are, Network Node 6100, Network Node 6200, Switch 6300, Switch 6400 and AswG 6600 (Application Switch Group); Network Node 6200 can access to Storage Pool 6600 via Switch 6400 (as well as FC Switch 6710).

Please see the lower half of FIG. 6. When physical resources are virtualized, the virtual resources supported by the physical resources of a physical POD can be represented by the abstract models. Thus, the Logical POD in the upper part of FIG. 6 can be delivered by the virtual resources and part of the physical resources (i.e., the gray area of the lower half of FIG. 6) of the physical POD in the lower half of FIG. 6, including: VM Instance 6120, VM Instance 6130, virtual switch 6150, Virtual Switch 6160 and Switch 6300. VM Instance 6130 can access Storage Pool 6600 via Virtual Switch 6400 (as well as iSCSI HBA 6191). Thus, in the case that physical resources are not virtualized, the resources subscribed by logical POD need to be delivered by two network nodes: Network Node 6100 and Network Node 6200; in the case that physical resources are virtualized, the resources can be delivered by one network node: Network Node 6100. Notably, Virtual Service Port 6122, 6133 and NIC 6182, 6193 are all delivery to the logical POD with VM Instance 6120, VM Instance 6130, Virtual Switch 6150, Virtual Switch 6160, and Switch 6300 together as a part of the resources for the Application Users to run their business. Virtual Management Port 6121, 6132 and NIC 6181, 6192 are provided to the service delivery platform for accessing VM Instance 6120 and VM Instance 6130 and carrying out their management operations. The model in the lower half of FIG. 6 depicts the method of how to deliver different virtual resources to a logical POD, which is the main focus of the present invention.

Please see FIG. 6. Supported by the service delivery platform, in particular based on all the virtual resource information described by Virtual Resource Data Model, VM instance can achieve live migrations. For example: VM Instance 6120 and VM Instance 6130 are allocated in the same VLAN6510; VM Instance 6220 and VM Instance 6230 are allocated in the same VLAN6520. When the VM instances on Network Node 6100 are very busy and Network Node 6200 is in idle status, or a VM instance (such as VM Instances 6120) on Network Node 6100 is in failure status, the delivery of Network Node 6100a in the logical POD can be re-scheduled from VM Instance 6120 on Network Node 6100 to VM Instance 6230 on network node 6200. Meanwhile, ASwG 6600 needs to be reconfigured; it regroups VM Instance 6230 from VLAN6520 to VLAN6510, which means VM Instance 6230 and VM Instance 6130 will be in the same VLAN, in order to maintain the continuity and consistency of the original business. The process of migration and re-configuration is transparent (invisible) to the user.

In short, the PODs specified by the present patent (mainly "server POD") have the following characteristics:

1. from the service consumer's viewpoint: a POD should provide at least one physical service interface (for example: Virtual Service Port 6122, 6133 are the physical interfaces used for accessing and operating VM Instance 6120, VM Instance 6130) to its service consumer (i.e. Application User)—thus Application User of the POD can consume (more precisely, interact) resources within the POD.

2. from the service provider's viewpoint: a POD should provide at least one physical service interface to its service provider (i.e. Project Operator)—thus Project Operator of the POD can predefine POD's specification according to his/her own will, to consume (more precisely, interact) the resources that naturally bound to each device within the POD.

3. A POD should have a physical management interface—thus System Operator can manage the POD according to the ITU-T TMN (Telecommunication Management Network) standards, namely: FCAPS (fault-management, configuration, accounting, performance, and security). (For example: Virtual Management Port 6121, 6132 are the physical interfaces used for accessing and operating VM Instance 6120, and VM Instance 6130).

4. The aforementioned physical service interface and physical management interface should be deployed in different network, i.e. in separated IP address hierarchies and in different VLANs (broadcast segments). We shall consider the accessing from the network backbone (core network) to routers/switches as those from a (virtual) terminal. A POD should at least have one physical terminal interface, allowing user's terminal to interact with the resources of the POD when necessary. (For example: external users access the interface of AswG 6600 through Load Balancer 4800).

5. A POD should support multi-tenant applications—User only needs to care about his/her own business but not other tenants', namely: service provision isolation. And a POD should not contain any nested POD. For example: in FIG. 4, a "server POD" should not contain another "server POD". And it has a peer-relation with "physical storage POD".

6. System Operator only provides the division of physical PODs to the application delivery, such as a single physical POD shown in FIG. 4; but not management which is achieved through a separate path; management is usually divided by domains such as: user domain, department domain, or geographic region. Therefore the PODs are application-service facing and the domains are management facing. From our design and resource's viewpoint, a logical POD is equivalent to an application (or a tenant).

The Virtual Resource Object Component proposed in the present invention is quite practical. It is a very flexible model that can dynamically abstract the physical resources in a physical POD as virtual resources. Once implemented, the model can be easily integrated into the embodiment environments, such as the service delivery platform described the present invention.

POD is application-service facing; from the resource viewpoint (i.e., looking up from the bottom), a POD is equivalent to an application (i.e., a tenant). A logical POD is service delivery platform facing; from the application user's viewpoint (i.e., looking down from the top), when dealing with competitions, the logical POD is multiplex of the virtual network resources.

Figure 7:
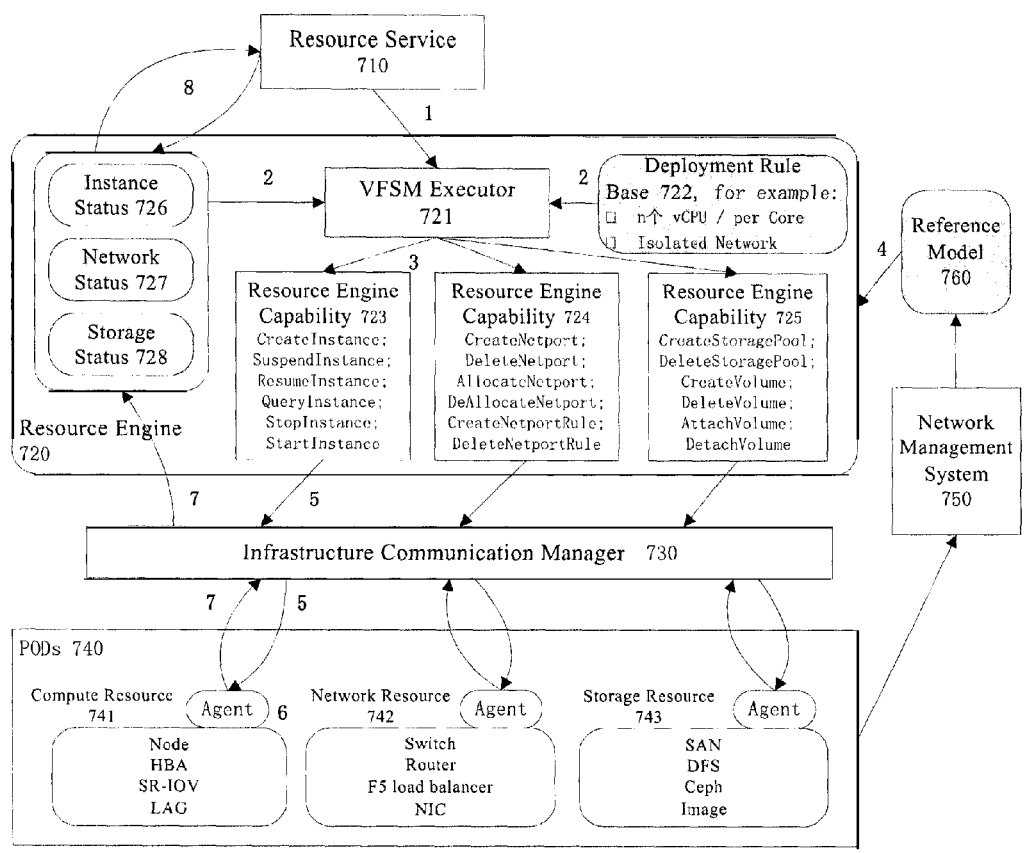
FIG. 7 is the structure diagram of the Resource Engine.
Figure 8:
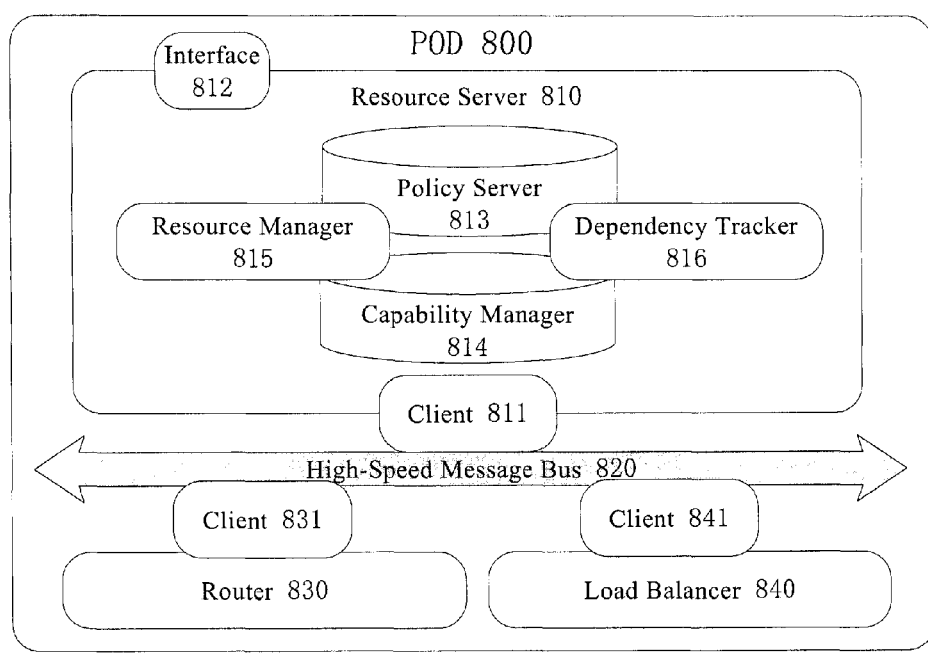
FIG. 8 is the structure diagram of the resource-aware infrastructure.

Please see FIG. 7, the structure diagram of the Resource Engine, which is implemented referring to FIG. 8: Cisco's structure diagram of resource-aware infrastructure. The static structures of these two have similarities; their fundamental difference is: the Resource Engine carries out the resource bindings between virtual resources and physical resources in the automated subscription-delivery process of the logical POD, and provides various virtual resource "capabilities" for the upper level (Deployment 201 in FIG. 2) by aggregation of different virtual resources; Cisco's resource-aware infrastructure achieves self-awareness of various devices within the POD, and enables the scheduling system of the PODs to make a deployment decision or send an subscription request directly through the Resource Server, without querying Service Inventory or Configuration Management Database.

In FIG. 7, Compute Resource 741, Network Resource 742 and Storage Resource 743 are all the resources of physical POD; they are equivalent to various infrastructure devices in FIG. 8, such as: Router 830, Load Balancer 840. The individual agents residing inside Compute Resource 741, Network Resource 742 and Storage Resource 743 are equivalent to the clients running on the devices in FIG. 8, such as: Client 831, Client 841. ICM 730 (infrastructure communication manager) in FIG. 7 achieves the functionality of High-Speed Message Bus 820 in FIG. 8. Resource Engine 720 realizes the Resource Server 810 in FIG. 8. In FIG. 7, POD 740 and Resource Engine 720 implement a Client/Server architecture.

Please see FIG. 7, Resource Engine 720 uses VFSM (Virtual Finite-State Machine) to manage the virtual resources; and calculates the capabilities of various resources in the service delivery processes. VFSM defines a type of finite state machine (FSM) in the virtual environment; it is a special type of finite state machine. VFSM provides a way of software specification which can be used to describe a control system; the control system uses "control properties" as input and "actions" as output. The details are beyond the scope of the present invention, so they need not be given here.

Please see FIG. 7, according to Deployment Rule Base 722 and a variety of virtual resource statuses (i.e. Instance Status 726, Network Status 727 and Storage Status 728), VFSM Executor 721 resolves the resource competition problem among multiple logical resources in a logical POD. VFSM Executor 721 is equivalent to Policy Server 813 in FIG. 8; Deployment Rule Base 722 is equivalent to Dependency Tracker 816 in FIG. 8. The difference between Deployment Rule Base 722 and Dependency Tracker 816 is: the rules in Deployment Rule Base 722 are concluded from the logical POD designed by Project Developer and all the virtual resource information described by the Virtual Resources Data Model that preserved in Reference Model 760; The dependencies dynamically tracked by Dependency Tracker 816 are interdependence relationships among the various resources in a physical POD. They do not involve the concepts of virtual resource and logical resource.

Please see FIG. 7. Instance Status 726, Network Status 727 and Storage Status 728 have realized some functionalities of Resource Manager 815; they are used to temporarily store the statuses of various virtual resources (i.e., dynamic information). Reference Model 760 in FIG. 7 is equivalent to Service Inventory or Configuration Management Database used by resource-aware infrastructure, but the former has more content than the latter. It not only preserves resource information of various physical resources, i.e. network, storage, and compute resources in physical POD, but also stores all virtual resource information described by Virtual Resource Data Model, even acts as Deployment Rule Base 722 used to keep backup rules. The main focus of the present invention Virtual Resource Object Component is also kept in Reference Model 760. Just like Service Inventory or Configuration Management Database in the resource-aware infrastructure, Reference Model 760 is not the best place to keep the dynamic data either. Resource Engine Capability 723, 724 and 725 in FIG. 7 achieves most of the functionalities of Capability Manager 814 in FIG. 8. Resource Engine 720 provides Resource Service 710 to the upper level in FIG. 7; it is equivalent to Interface 812 in FIG. 8.

Virtual resource scheduling and physical resource scheduling throughout the POD subscription-delivery processes are implemented by the Resource Engine. The implementation of Resource Engine in the present invention is loosely based on Cisco's "Resource-Aware Infrastructure" architecture. Please see FIG. 8, or refer to page 247 of the book "Cloud Computing: Automating the Virtualized Data Center".

In general, Service Inventory or Configuration Management Database can be used as independent sources for extracting the infrastructure information, such as network, storage and compute resource information. But they are not necessarily the best place to store dynamic data. As an alternative solution, "Resource-aware Infrastructure" autonomously self-aware what devices exist within a POD, what relationships exist between the devices, what kinds of capabilities these devices have, what limitations the devices are imposed, and how much workloads the devices are carrying. The relationship models can still be stored in Service Inventory or Configuration Management Database. The next task is deciding how to map the service deliveries to the PODs, thereby enables Resource Engine to determine how to bind and manage the resources.

Please see FIG. 8, Resource-aware Infrastructure. In FIG. 8, High-Speed Message Bus 820 uses protocols such as XMPP (Extensible Messaging and Presence Protocol) to connect Client 811, Client 831, and Client 841. They reside on Router 830, Load Balancer 840, and Resource Server 810, respectively. Resource Server 810 is responsible for POD 800. Through Policy Server 813 and Capability Manager 814, Resource Server 810 obtains a set of policies and capabilities, which can be updated based on the content of Client 811 (and Client 831, Client 841). In POD 800, Resource Server 810 tracks resource utilization information through Resource Manager 815; and tracks interdependency relationships among the resources through Dependency Tracker 816. Using Interface 812, the scheduling system on POD 800 does not have to check the Service Inventory or Configuration Management Database by itself. It can make a deployment decision or a subscription request directly through Resource Server 810—this is because POD 800 can autonomously self-ware its resources (such as Router 830, Load Balancer 840).

Figure 9:
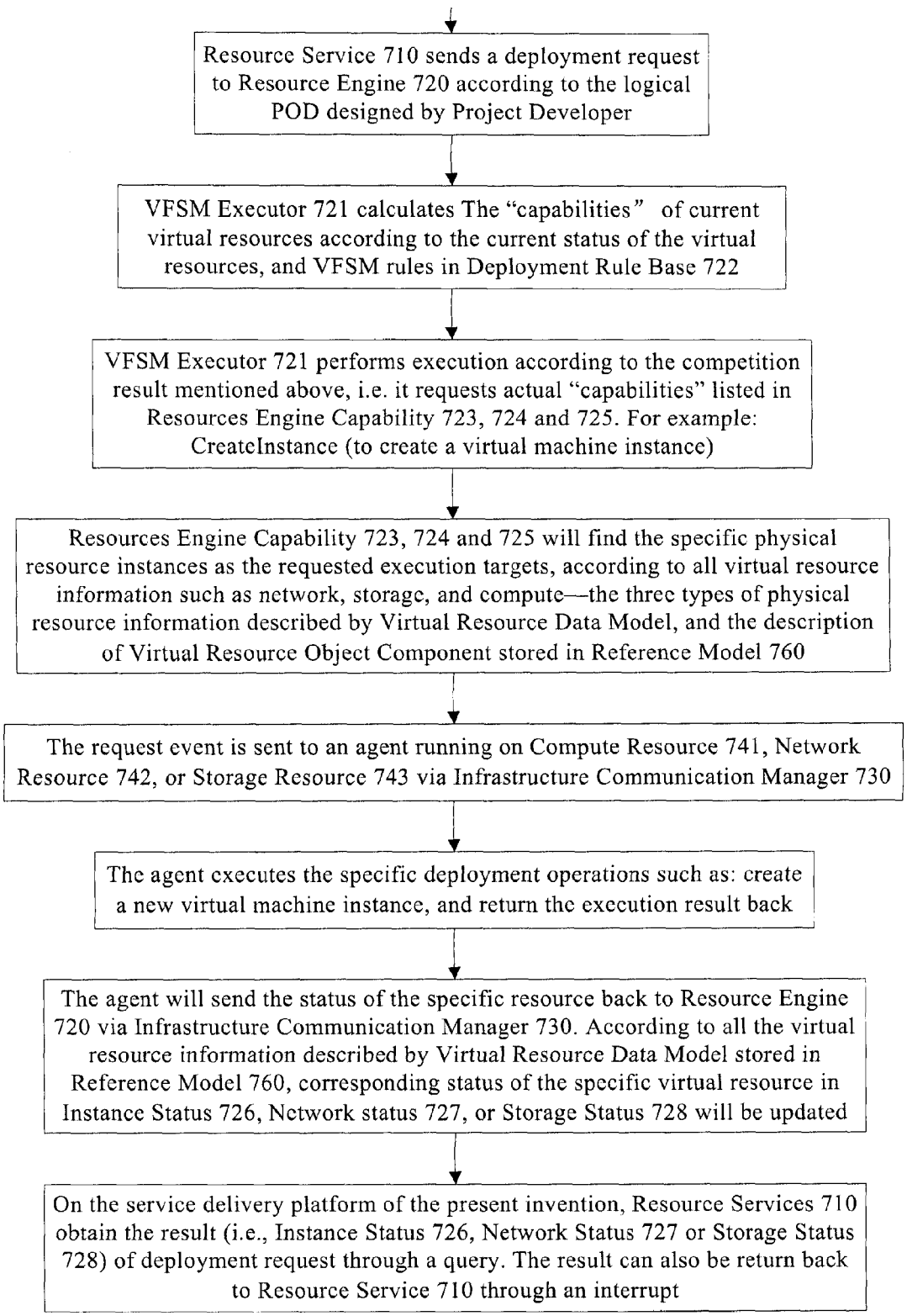
FIG. 9 is the execution flowchart of the Resource Engine.

Please see FIG. 8. The workflow of the Resource Engine is as follows (and FIG. 9):

Step 1: Resource Service 710 sends a deployment request to Resource Engine 720 according to the logical POD designed by Project Developer.

Step 2: VFSM Executor 721 calculates the capabilities of current virtual resources according to the current status of the virtual resources (i.e. Instance Status 726, Network Status 727 and Storage status 728), QoS (a parameter of the deployment request), and VFSM rules in Deployment Rule Base 722. It's noteworthy that the capabilities are calculated by VFSM Executor 721; they are the competition result drawn from QoS. Since the actual resource capabilities are defined by VFSM (software), we consider the management target of the service delivery platform of the present invention is the "software-defined" data center of an enterprise.

Step 3: VFSM Executor 721 performs execution according to the competition result mentioned above, i.e. it requests actual "capabilities" listed in Resources Engine Capability 723, Resources Engine Capability 724 and Resources Engine Capability 725. For example: CreateInstance (to create a virtual machine instance), StopInstance (to stop a virtual machine instance).

Step 4: Resources Engine Capability 723, 724 and 725 will find the specific physical resource instances as the requested execution targets, according to all virtual resource information such as network, storage, and compute—the three types of physical resource information described by Virtual Resource Data Model, and the description of Virtual Resource Object Component stored in Reference Model 760.

Step 5: The request event is sent to an agent running on Compute Resource 741, Network Resource 742, or Storage Resource 743 via Infrastructure Communication Manager 730.

Step 6: The agent executes the specific deployment operations such as: create a new virtual machine instance, and return the execution result back.

Step 7: The agent will send the status of the specific resource back to Resource Engine 720 via Infrastructure Communication Manager 730. According to all the virtual resource information described by Virtual Resource Data Model stored in Reference Model 760, corresponding status of the specific virtual resource in Instance Status 726, Network status 727, or Storage Status 728 will be updated.

Step 8: On the service delivery platform of the present invention, Resource Services 710 obtain the result (i.e., Instance Status 726, Network Status 727 or Storage Status 728) of deployment request through polling. The result can also be returned back to Resource Service 710 through interrupt.

Please see FIG. 2; in Project Delivery Network 200, by calling the resource services, Deployment Component 201 makes the scheduling in the form of "push" or "pull" between the logical POD and Resource Engine 204. If the scheduling is "push", it will make the commitment to the request of resource changing regardless of the capability of the physical POD; and support parallel provisioning of the resources. If the scheduling is "pull", it will make the commitment to the request of resource changing only when the capacity of the physical POD is ready; and support parallel provisioning of the resources.

The above embodiment is provided to persons of ordinary skill in the art to implement and utilize the present invention. Ordinary skill in the art may make various modification or variation to the embodiment described above without departing from the innovative idea of the present invention. Therefore the scope of the present invention shall not limit to the above embodiment, it should be in the maximum range of innovative features that consistent with the claims mentioned.

What is claimed is:

1. A computer-implemented method for service delivery comprising: providing a module of a virtual resource object component, said module being designed as a piece of POD (point-of-delivery) mapping template representing physical resources in a physical POD as virtual resources; and being utilized by a service delivery platform system, wherein said service delivery platform system organizes and connects the physical resources of a physical POD, and automatically transforms the physical resources into virtual resources of a logical POD, producing mapping relationships that links physical PODs and logical PODs in 1-to-1 or 1-to-many relationships; said service delivery platform includes three scheduling units including:

a Project Delivery Scheduling Unit including a Requirement Design Service of computing, storage, and network resources, a System Resource Analysis Service, a Virtual Resource Subscription and a Deployment Service, wherein the Deployment Service deployment is a process for assigning virtual resources to logical resources in a logical POD such that the virtual resources are mapped to the logical resources in a form of 1-to-1 matching forming a first-time binding in an automated subscription-delivery process of the logical POD;

a Virtual Resource Scheduling Unit including virtual resource allocation, configuration, and provisioning services, the provisioning service including a process of mapping physical resources to virtual resources undertaken by a Resource Engine forming a second-time binding in the automated subscription-delivery process, wherein said Resource Engine provides various virtual resource capabilities by aggregation of different virtual resources, and preserves the states of each virtual resource status models, thereby carrying out the resource bindings between virtual resources and physical resources; and a Physical Resource Scheduling Unit including different agents residing in physical resources to receive instruction of resource configuration from the Resource Engine; the Physical Resource Scheduling Unit realizing resource multiplexing, resource space sharing; wherein resource statuses are sent back to the Resource Engine through the agents.

2. The method of claim 1, wherein the virtual resource object component includes an independent storage POD and an independent server POD, wherein said storage POD comprises at least one of a NAS (Network Attached Storage), a DFS (Distributed File System) and a software-simulated iSCSI, wherein said server POD comprises multiple network nodes, wherein each network node represents a physical server, and includes multiple virtual machine instances, wherein each virtual machine instance represents a virtual server, and includes multiple virtual ports combining of virtual storage ports, virtual management ports and virtual service ports, wherein each virtual port connects to a corresponding virtual switch, wherein each network node also includes multiple virtual switches which connect to physical Ethernet NICs (Network Interface Cards), iSCSI HBAs (Host Bus Adapters) or FC (Fibre Channel) HBAs, wherein (1) the NICs connect to a physical switch outside the network node via one or multiple LAG (Link Aggregation Group), and then connect to a FC switch for a NAS (Network Attached Storage), DFS (Distributed File System) or software-simulated iSCSI, (2) the iSCSI HBAs directly connect to said storage POD, (3) the FC HBAs or FCoE (Fibre Channel over Ethernet) HBAs connect to optical switches connecting to said storage POD via multiple channels, wherein said physical switch connects to an ASwG (Application Switch Group) which is responsible to divide VLANs (Virtual Local Area Network); wherein said ASwG, to achieve an Elastic IP Address, processes each external request received by balancing load assigned to a VLAN based on the real-time workload information.

3. The method of claim 1, wherein said logical POD is a logical unit of resource provisioning, which is a combination of logical compute, network, and storage resources required by a user's project, wherein said logical POD is specified by a user, and said resources have the characteristics of time-sharing or space-sharing.

4. The method of claim 1, wherein said physical POD is a physical unit of resource provisioning, which is a module of compute, network, and storage components that work together to deliver resource provisioning services in a data center, wherein said physical POD works independently from other components outside the POD, and is a basic unit of resource provisioning.

5. The method of claim 1, wherein said logical POD supports multi-tenant applications and achieves separation between different users' projects.

6. The method of claim 1, wherein the Resource Engine carries out the second-time binding in the automated subscription-delivery process, and provides various virtual resource capabilities for upper level by aggregation of different virtual resources;
wherein said physical POD includes compute, network and storage resources, in which individual agents carry out specific deployment operations, and send the statuses of specific resource back to the Resource Engine via the ICM (infrastructure communication manager based on TCP/IP protocol); said resources of physical PODs and the Resource Engine comply with a client/server architecture; the Resource Engine includes a vFSM (virtual finite state machine) executor, deployment rule base, one or more virtual resource status and resource engine capabilities; said Resource Engine uses the vFSM to manage virtual resources, calculates the capabilities of resources in a service delivery process; wherein said vFSM is a finite state machine defined in the virtual environment; according to the rule base of deployment and the status of various virtual resources, said vFSM is executed to resolve the resource competition problem among multiple logical resources in a logical POD;
wherein the status of said virtual resources includes instance status, network status, storage status, and cache status; wherein said resource engine capabilities achieve functions of capability management; wherein said reference model is used to preserve the resource information of the physical resources including network, storage and compute resources in a physical POD, and to store all virtual resource information described by Virtual Resource Data Model, wherein said reference model is implemented by a database.

7. The method of claim 1, wherein said Resource Engine performs the following steps:
receiving a deployment request from a Resource Service module according to the logical POD designed by a user or a project developer;
calculating, by said vFSM Executor, the capabilities of current virtual resources according to the current status of the virtual resources, QoS (quality of service), and vFSM rules in the Deployment Rule Base, where in current status comprises Instance Status, Network Status and Storage Status; said capabilities are calculated by vFSM Executor; and said capabilities are the competition result drawn from QoS;
executing, by said vFSM Executor, according to said competition result, and requesting actual capabilities from Resources Engine Capability, wherein said actual capabilities includes at least two operations of creating a virtual machine instance and stopping a virtual machine instance;
finding, by said Resources Engine Capability, specific physical resource instances as the requested execution targets, according to all virtual resource information comprising network, storage, and compute resource information stored in said Reference Model;
sending a request event to an agent running on said Compute Resource, Network Resource, or Storage Resource via the ICM (Infrastructure Communication Manager);
executing, by said agent, one of the specific deployment operations, including at least two deployment operations of creating a new virtual machine instance, and returning the execution result back;
receiving the status of specific resource from said agent via the ICM (Infrastructure Communication Manager), according to the virtual resource information, wherein said virtual resource information is described by the Virtual Resource Data Model stored in the Reference Model, and corresponding status of said specific virtual resource in Instance Status, Network status, or Storage Status is updated; and
obtaining, by said Resource Service module, the result of deployment request through polling, wherein said result is one of the Instance Status, Network Status and Storage Status, and said result is returned back to said Resource Service module through interrupt.

* * * * *